United States Patent [19]

Liu

[11] Patent Number: 5,211,105
[45] Date of Patent: May 18, 1993

[54] SMOKELESS AND SCORCHLESS GRILL PAN

[76] Inventor: I-Wen Liu, 5F, No. 52, Lane 286 Section 1, Cheng Kou S. Road, Taipei, Taiwan

[21] Appl. No.: 977,105

[22] Filed: Nov. 16, 1992

[51] Int. Cl.⁵ .................. A47J 27/00; A47J 37/07
[52] U.S. Cl. .................................. 99/446; 99/400; 99/413; 99/450; 126/9 R; 126/348; 126/369
[58] Field of Search .............. 99/375, 400, 425, 413, 99/416, 417, 418, 410, 444–446, 450, 482; 126/369, 348, 373, 25 R, 9 R, 377; 220/428, 912, 23.83

[56] References Cited

U.S. PATENT DOCUMENTS

| | | | |
|---|---|---|---|
| 640,030 | 12/1899 | Rietzke | 99/445 |
| 676,479 | 6/1901 | Wagner | 99/445 |
| 1,862,420 | 6/1932 | O'Brien | 99/446 |
| 1,956,387 | 4/1934 | Hartman | 99/446 |
| 2,884,849 | 5/1959 | Priem | 99/444 |
| 3,509,814 | 5/1970 | Karapetian | 99/445 |
| 4,727,853 | 3/1988 | Stephen et al. | 99/444 |
| 4,793,324 | 12/1988 | Caferro | 126/369 |
| 4,938,202 | 7/1990 | Hait | 126/9 R |
| 5,044,266 | 9/1991 | Geogaris | 99/446 |
| 5,076,155 | 12/1991 | Golob | 99/413 |

FOREIGN PATENT DOCUMENTS 2080097 2/1982 United Kingdom ................ 99/444

Primary Examiner—Timothy F. Simone

[57] ABSTRACT

A smokeless and scorchless grill pan comprising a food plate, an oil pan placed under the food plate, and a lower pan placed under the oil pan for burning a fire to heat the oil pan and the air in a hollow space between the oil pan and the food plate, the oil pan having a bottom corrugated with a plurality of holes for heated air to flow through and two opposite recesses near a circumferential edge, the food plate also corrugated and having a plurality of oil holes for oil coming out of food placed on the food plate to flow through down to drop on the oil pan and then flow into the two opposite recesses of the oil pan.

1 Claim, 3 Drawing Sheets

SMOKELESS AND SCORCHLESS GRILL PAN

BACKGROUND OF THE INVENTION

Nowadays, fry pans or grill irons are made of an one-layer metal plate or net, and a heat source heats up the plater or the net, and food placed thereon may directly receive the fire or the heat from the heated plate so that the food may easily and often heated up excessively and be scorched. In addition, oil coming out of the food may directly fall down through the net into the fire to burn up, giving out smoke or explosive sounds as to endanger persons around and to smear the environment. Meat fried in a fry pan may be fried together with the oil coming out of its own, losing fried good smell and containing too much oil as well.

SUMMARY OF THE INVENTION

This invention, a smokeless and scorchless grill pan, has been devised to improve conventional fry pans or grill irons, aiming to have advantages as listed below.

1. It is simple and easy to be combined together and convenient to be used.
2. Food grilled on it may contain less oil by letting the oil coming out of the food to flow down from a food plate to a oil pan placed under the food plate, so can keep good smell.
3. Food grilled on it may not be scorched, and prevent from producing scorched organic matters tending to cancer.
4. Oil coming out of food grilled on it can be guided into recesses provided in an oil pan for easy cleaning after use.
5. Oil coming out of food is prevented from dropping on fire in a lower pan, so dangerous oil burning or explosion can be avoided.

The smokeless and scorchless grill pan in the present invention comprises a food plate, an oil pan, and a lower pan combined together. The food plate is to be placed on the oil pan, having a corrugated shape, and a plurality of oil holes in lower straight lines. The oil pan is to be placed on the lower pan, having also a corrugated bottom, a plurality of holes in upper straight ridges in the bottom, two opposite recesses near a circumferential edges for collecting oil, a circumferential lower wall extending vertical from the circumferential bottom edge, a flat circumferential wall extending from the lower wall and an upper circumferential wall extending from the flat. The lower pan has a proper height to burn a fire therein to heat air and the oil pan so that heated air can rise up the holes in the oil pan to spread around a hollow space between the oil pan and the food plate to heat the food plate so as to grill the food placed on the food plate. Oil coming out of food on the food plate flows through the oil holes therein and drips down on the oil pan and then flows into the two recesses therein so that the oil cannot drip down into the fire in the lower pan.

DETAILED DESCRIPTION OF THE INVENTION

Figure 1:
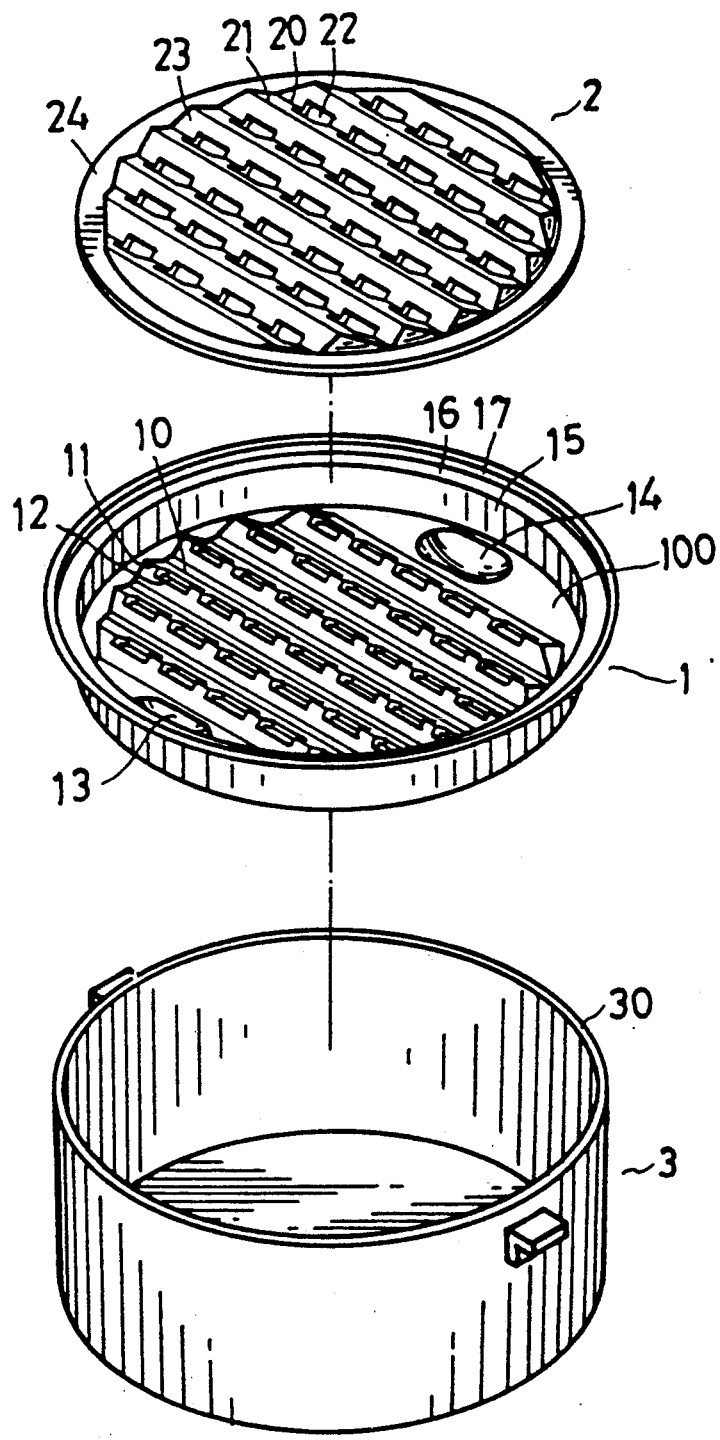
FIG. 1 is an exploded perspective view of a smokeless and scorchless grill pan in the present invention.

A smokeless and scorchless grill pan in the present invention, as shown in FIG. 1, comprises an oil pan 1, a food plate 2 and a lower pan 3 combined together.

The oil pan 1 has a bottom corrugated with guide grooves 10, upper straight ridges 11 for conducting heat, a plurality of holes 12 along the upper straight ridges 11, two opposite oil gathering recesses 13, 14 near a circumferential edge for oil to flow down therein, a lower vertical circumferential wall 15 extending from the circumferential edge, a flat circumferential wall 16 extending outward from the lower circumferential wall 15 and an upper vertical circumferential wall 17 extending upward from the flat wall 16. And the center of the guide grooves 10 is a little higher than the circumferential edge to enable oil coming down from the food plate can gradually flow down into the two recesses 13, 14.

The food plate 2 is to place thereon food to be grilled, having a corrugated shape as the oil pan 1 with lower straight lines 20, upper straight ridges 21, a plurality of oil holes 22 along the lower straight lines 20, a sloped surface 23 between each line 20 and each ridge 21, and a circumferential flat rim 24 to fit and sit on the circumferential flat wall 16 of the oil pan 1.

Figure 2:
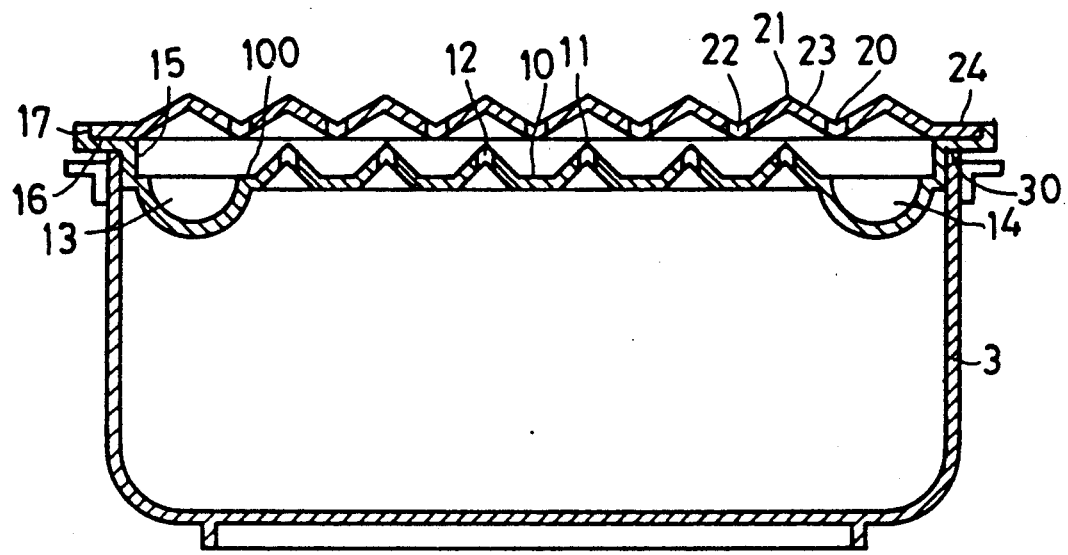
FIG. 2 is a front cross-sectional view of the smokeless and scorchless grill pan in the present invention.
Figure 3:
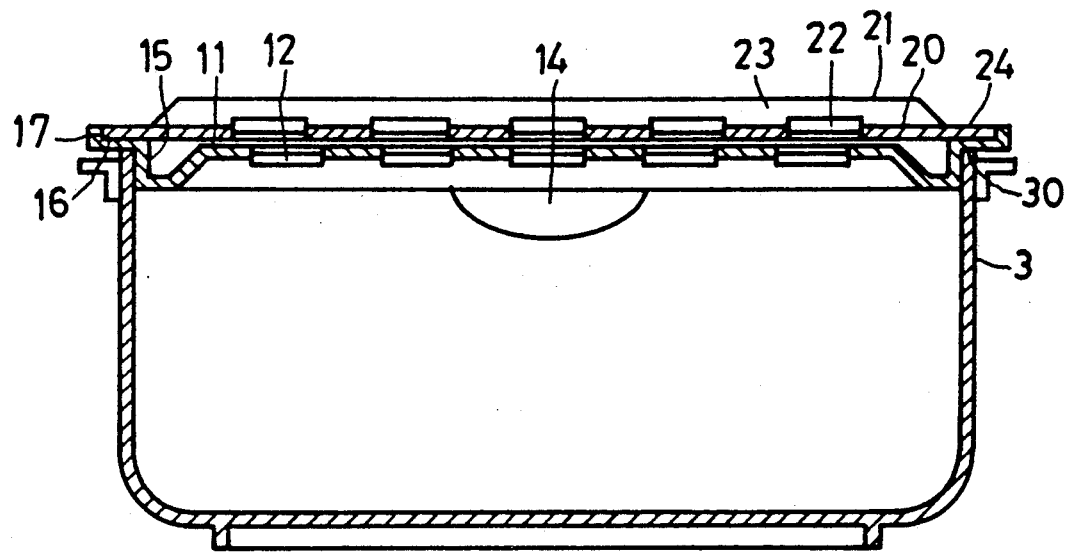
FIG. 3 is a side cross-sectional view of the smokeless and scorchless grill pan in the present invention.
Figure 4:
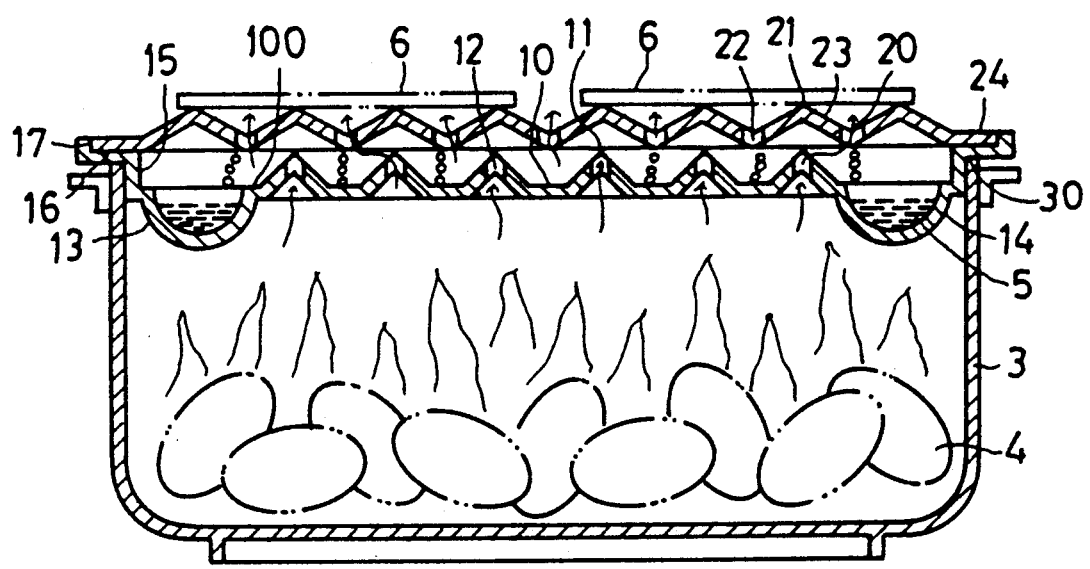
FIG. 4 is a cross-sectional view of the smokeless and scorchless grill pan being used in the present invention.

The lower pan 3 is shaped such that the oil pan 1 can sit on a circumferential edge 30 of the lower pan 3 as shown in FIGS. 2 and 3, with the lower vertical circumferential wall 15 fitting around the circumferential edge 30, and the food plate 2 sits on the oil pan 1, with the flat circumferential rim 24 overlapping the flat circumferential wall 16, when those three components 1,2, and 3 are combined together.

After this grill pan is assembled together, the oil pan 1 and the food plate 2 form an empty space enclosed by the vertical walls 16 and 17 so that the air in the empty space can flow up and down in a convectional way. And the upper straight ridges 21 and the oil holes 22 in the food plate 2 are located just above the upper straight ridges 11 and the guide grooves 10 of the oil pan 1 so that heat coming from a fire 4 burned in the lower pan 3 can pass through the holes 12, spreading around in the hollow space between the oil pan 1 and the food plate 2 and flowing in convectional way to go up through the oil holes 22 and then to reach evenly and wholly food 6 placed on the food plate 2. Therefore, the food 6 is indirectly heated, without possibility of being scorched by too strong fire, and the oil coming out of the food 6 will directly drop down in the lower straight lines 20 or drip along the sloped surfaces 23 to the lower lines 20, then through the oil holes 22 and down on the guide grooves 19 in the oil pan 1, finally drips into the oil gathering recesses 13, 14 to mix with the water previously put therein. So it is easy to clean the oil pan 1 and prevent from dripping down into the fire 4 in the lower pan 3, from causing dangerous explosion or giving burn to a person cooking.

What is claimed is:

1. A smokeless and scorchless grill pan comprising;
   an oil pan having a bottom corrugated with guide grooves, upper straight ridges, a plurality of holes along the upper straight ridges, at least two opposite oil gathering recesses for oil near a circumferential edge to drip down therein, a lower vertical circumferential wall, a circumferential flat wall extending outward from the top of the lower circumferential wall, and a upper vertical circumferential wall extending upward from said flat circumferential wall;

a food plate to be placed on said oil pan for placing thereon food to be grilled, shaped as corrugated as the oil pan with lower straight lines, upper straight ridges, a plurality of oil holes along said lower straight lines, sloped surfaces between each said line and each said upper ridges, a flat circumferential rim to fit and sit on said flat circumferential wall of said oil pan;

a lower pan to be placed under said oil pan, having a proper height for burning a fire on its bottom and an upper circumferential edge for the flat circumferential wall of the oil pan to sit thereon, and for the lower circumferential wall to fit around the inner circumferential surface thereof; and said lower pan serving as a stove to burn a fire therein for supplying heat, which rises up through the holes in the oil pan, flowing around the hollow space between the oil pan and the food plate and heating up the air therein to heat the food plate and the heated air passing through the oil holes in the food plate to grill food placed on the food plate, said oil holes in the food plate permitting the oil coming out of the food to drip through to flow along the lower guide grooves into said two opposite recesses on the oil pan so that said oil may not drop down into the fire on the lower pan so as to avoid oil burning and oil explosion to give out smoke.

* * * * *